US012654648B2

(12) United States Patent
Chen et al.

(10) Patent No.: US 12,654,648 B2
(45) Date of Patent: Jun. 16, 2026

(54) HEIGHT-ADJUSTABLE SEAT BELT GUIDE OUTLETS FOR SEAT BACKRESTS

(71) Applicant: Adient (Chongqing) Automotive Components Co., Ltd., Chongqing (CN)

(72) Inventors: Zhiyong Chen, Chongqing (CN); Ming Zhang, Chongqing (CN); Ying Guan, Chongqing (CN); Yawei Liu, Chongqing (CN); Zhangneng Shi, Chongqing (CN)

(73) Assignee: Adient (Chongqing) Automotive Components Co., Ltd., Chongqing (CN)

( * ) Notice: Subject to any disclaimer, the term of this patent is extended or adjusted under 35 U.S.C. 154(b) by 120 days.

(21) Appl. No.: 18/931,190

(22) Filed: Oct. 30, 2024

(65) Prior Publication Data

US 2025/0136035 A1 May 1, 2025

(30) Foreign Application Priority Data

Oct. 30, 2023 (CN) .......................... 202322927038.0

(51) Int. Cl.
| | |
|---|---|
| *B60R 22/26* | (2006.01) |
| *B60N 2/64* | (2006.01) |
| *B60N 2/68* | (2006.01) |
| *B60R 22/02* | (2006.01) |
| *B60R 22/18* | (2006.01) |
| *B60R 22/20* | (2006.01) |
| *B60R 22/34* | (2006.01) |

(52) U.S. Cl.
CPC .............. *B60R 22/02* (2013.01); *B60N 2/643* (2013.01); *B60R 22/34* (2013.01); *B60R 2022/3402* (2013.01)

(58) Field of Classification Search
CPC . B60R 2022/1818; B60R 22/26; B60R 22/18; B60R 22/20; B60N 2/688
See application file for complete search history.

(56) References Cited

U.S. PATENT DOCUMENTS

| | | | | |
|---|---|---|---|---|
| 4,884,825 A * | 12/1989 | Grunewald | ........... | B60R 22/205 297/483 |
| 5,390,982 A * | 2/1995 | Johnson | ................. | B60N 2/829 297/483 |
| 6,145,881 A * | 11/2000 | Miller, III | ............... | B60R 22/20 280/808 |
| 6,336,664 B1 * | 1/2002 | Roder | ................. | B60R 22/1958 297/480 |
| 6,811,186 B1 * | 11/2004 | Fraley | .................... | B60R 22/20 297/483 |

(Continued)

*Primary Examiner* — Shin H Kim
(74) *Attorney, Agent, or Firm* — Marshall & Melhorn, LLC

(57) ABSTRACT

A height-adjustable safety belt guide outlet for a seat backrest. The height-adjustable safety belt guide outlet may have a backrest, a base, a sliding component, a safety belt guide component and a driving assembly. The base may be fixedly mounted at a shoulder position of the backrest. The sliding component may be fitted on the base to slide vertically in a height direction of the backrest. The safety belt guide component may be fixedly mounted on the sliding component. The driving assembly may be fitted between the base and the sliding component, and may be used for driving the sliding component to slide vertically.

9 Claims, 3 Drawing Sheets

(56)  References Cited

U.S. PATENT DOCUMENTS

| | | | | |
|---|---|---|---|---|
| 7,331,610 | B2 * | 2/2008 | Herrmann | B60R 22/20 |
| | | | | 297/480 |
| 11,059,450 | B2 * | 7/2021 | Ohno | B60R 22/26 |
| 11,173,872 | B2 * | 11/2021 | Ohno | B60R 22/34 |
| 11,584,332 | B2 * | 2/2023 | Sugamata | B60R 22/20 |
| 11,840,193 | B2 * | 12/2023 | Kim | B60R 22/201 |
| 12,370,975 | B2 * | 7/2025 | Jaradi | B60R 22/26 |
| 2008/0309111 | A1 * | 12/2008 | Marriott | B60N 2/688 |
| | | | | 280/808 |
| 2011/0062696 | A1 * | 3/2011 | Strnad | B60R 22/24 |
| | | | | 280/801.2 |
| 2014/0312677 | A1 * | 10/2014 | Bostrom | B60R 22/20 |
| | | | | 297/464 |
| 2016/0137160 | A1 * | 5/2016 | Dingman | B60R 22/28 |
| | | | | 280/801.2 |
| 2018/0009409 | A1 * | 1/2018 | Gast | B60R 22/26 |
| 2020/0207239 | A1 * | 7/2020 | Navatte | B60N 2/0296 |
| 2020/0262316 | A1 * | 8/2020 | Gumprecht | B60N 2/1615 |
| 2023/0015173 | A1 * | 1/2023 | Kim | B60R 22/201 |
| 2024/0409060 | A1 * | 12/2024 | Pelka | B60N 2/688 |

* cited by examiner

HEIGHT-ADJUSTABLE SEAT BELT GUIDE OUTLETS FOR SEAT BACKRESTS

TECHNICAL FIELD

The present application relates to a three-point safety belt for an automobile seat, and in particular relates to a height-adjustable safety belt guide outlet for a seat backrest.

BACKGROUND ART

The safety belt has continuously played a key role as one of the indispensable safety components of automobiles; the safety belt structure commonly used in automobiles is a three-point safety belt, which consists of a safety belt retractor, a safety belt guide outlet component, a buckle component, a lower anchor, safety belt webbing and a tongue, the safety belt retractor and the safety belt guide outlet component being fixedly mounted to a B-pillar of an automobile, and the buckle component and the lower anchor being fixedly mounted at two sides of an automobile seat.

With the expansion of the automobile market, market competition is also increasingly fierce, and the requirements of customers for the quality, refinement and comfort of automobiles are increasingly higher; the automobile seat is one the components that the user comes into direct contact with and uses most frequently, and therefore the comfort and multifunctionality of the automobile seat are clearly especially important. As a result, zero-gravity seats have emerged.

Zero-gravity seats have functions such as backrest tilt adjustment, seat frame tilt adjustment and overall seat tilt adjustment, which can allow for sitting postures of multiple angles for the occupant; however, the guide outlet components of conventional three-point safety belts are normally fixedly mounted to a B-pillar, and, when the occupant is in a reclined mode or zero-gravity reclining state, the safety belt cannot restrain the occupant in the established way, and there remains potential for optimization and improvement in terms of comfort and safety.

SUMMARY

In view of this, the present application provides a height-adjustable safety belt guide outlet for a seat backrest, with the aim of being able to automatically adjust a safety belt to a relatively safe and comfortable wearing height for sitting posture states of multiple angles.

To achieve the above object, technical solutions of the present application are as follows:

A height-adjustable safety belt guide outlet for a seat backrest, the height-adjustable safety belt guide outlet comprising:

a backrest;

a base, which is fixedly mounted at a shoulder position of the backrest;

a sliding component, the sliding component being fitted on the base so as to be able to slide vertically in a height direction of the backrest;

a safety belt guide component, which is fixedly mounted on the sliding component;

and a driving assembly, which is fitted between the base and the sliding component, and used for driving the sliding component to slide vertically.

Using this structure, the driving assembly drives the sliding component to move vertically, so as to achieve lifting adjustment of the safety belt guide outlet, thereby ensuring that, for different body types of occupants and under sitting posture states of multiple angles, by means of adjusting the position of the safety belt guide outlet, the wearing comfort of the safety belt can be ensured and the restraint effect remains optimal.

Preferably, the base comprises a lower base and an upper base that is fixedly mounted on the lower base by means of a screw, and the lower base being fixedly fitted at the shoulder position of the backrest; using this structure, mounting positions of the bases are defined.

Preferably, an upper end and a lower end of the upper base are provided with an upwardly bent support plate, two guide rods being fixedly mounted between two groups of the support plates, an upper end and a lower end of the sliding component being provided with a downwardly extending assembly plate, and a sliding hole that slidably fits over the guide rod being provided on the assembly plate; using this structure, a path of motion of the sliding component is defined.

Preferably, the driving assembly comprises an electric motor and a lead screw that is in motive power connection with an output shaft of the electric motor, the electric motor being fixedly fitted on an outer side of one of the support plates, and two ends of the lead screw being rotatably supported on two said support plates; using this structure ensures a motive power source of the sliding component.

Preferably, the electric motor is a reduction motor, and an upper end of the lead screw is in motive power connection with an output end of the electric motor; using this structure simplifies the structure of the motive power source.

Preferably, the height-adjustable safety belt guide outlet further comprises a safety belt retractor that is mounted to a shoulder rear side of the backrest; using this structure ensures the basic function of the safety belt.

Preferably, a bushing is fitted in the sliding hole; using this structure causes the sliding component to slide more smoothly on the guide rod.

Preferably, the sliding component is a linear sliding block; using this structure, the type and manner of motion of the sliding component is defined.

Preferably, the driving assembly comprises an electric motor and a synchronous belt, a synchronous wheel being fitted over an output end of the electric motor, a directional wheel being provided on the base, the synchronous belt being fitted over the synchronous wheel and the directional wheel, and the sliding component being fixedly mounted on the belt; using this structure, the operation of the electric motor drives the operation of the belt so as to drive the motion of the sliding component, thereby achieving height adjustment of the safety belt guide outlet.

Compared with the prior art, beneficial effects of the present utility model are:

1. With the height-adjustable safety belt guide outlet for a seat backrest, motion of the sliding assembly driven by the driving assembly can achieve height adjustment of the safety belt guide outlet; in any riding mode, the safety belt can be automatically adjusted to a relatively safe and comfortable wearing height, which helps to increase the comfort and safety of the seat.

2. Compared with a conventional seat safety belt mounting structure, the height of the safety belt guide outlet is adjustable, which ensures that comfort can be optimal for occupants with different body types who wear the safety belt.

3. The safety belt being integrated on the seat ensures that when a seat angle adjustment range is enlarged, a restraining effect of the safety belt on the occupant is not affected.

DETAILED DESCRIPTION

The present device and method are further explained below in conjunction with the embodiments and accompanying drawings.

Figure 1:
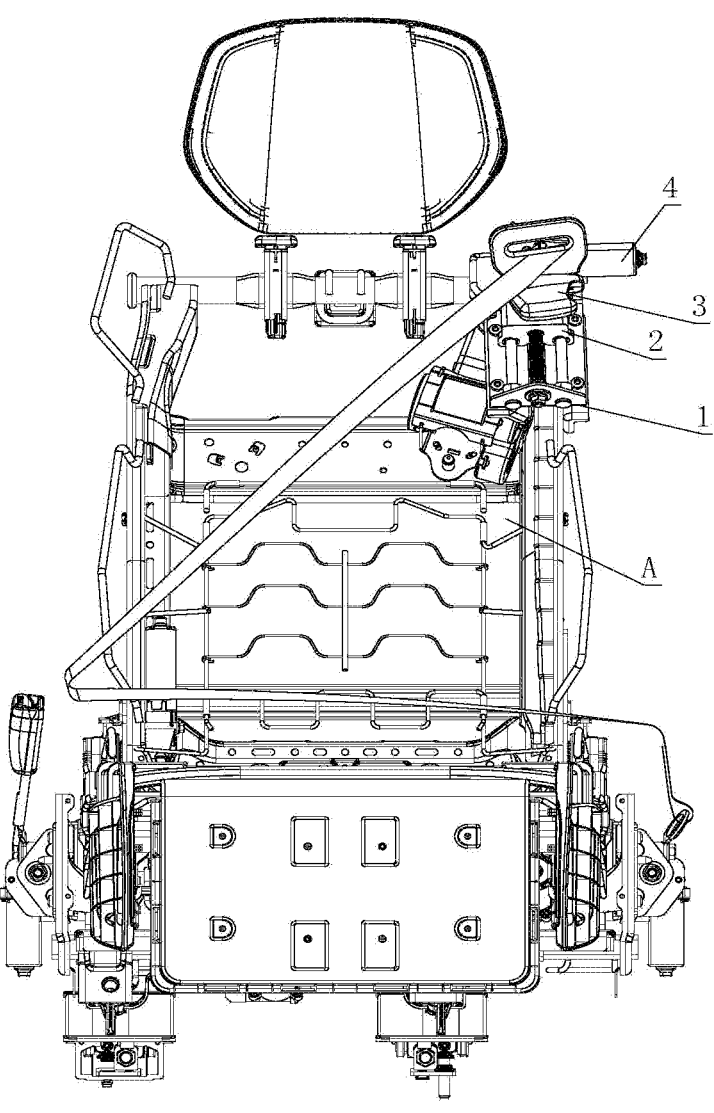
FIG. 1 shows an assembly drawing (front view) of an automobile seat and a height-adjustable safety belt guide outlet for a seat backrest.

As shown in FIG. 1, a height-adjustable safety belt guide outlet for a seat backrest comprises a backrest A and a base 1. In the present embodiment, the base 1 is fixedly mounted at a shoulder position of the backrest A, and the height-adjustable safety belt guide outlet further comprises a sliding component 2. The sliding component 2 is slidably mounted on the base 1 in a height direction of the backrest A. A safety belt guide component 3 being further fixedly mounted on an upper face of the sliding component 2. A driving assembly 4 is mounted between the base 1 and the sliding component 2. The driving assembly 4 is used for driving the sliding component 2 to move vertically. With such a design, vertical motion of the sliding component 2 achieves height adjustability of the safety belt guide outlet, and in this way can adapt to groups with different body types, ensuring wearing comfort of the safety belt, and the safety belt guide component 3 being mounted on the seat backrest A can also ensure that the safety belt can always have a restraining effect on an occupant while enlarging a seat angle adjustment range.

Figure 2:
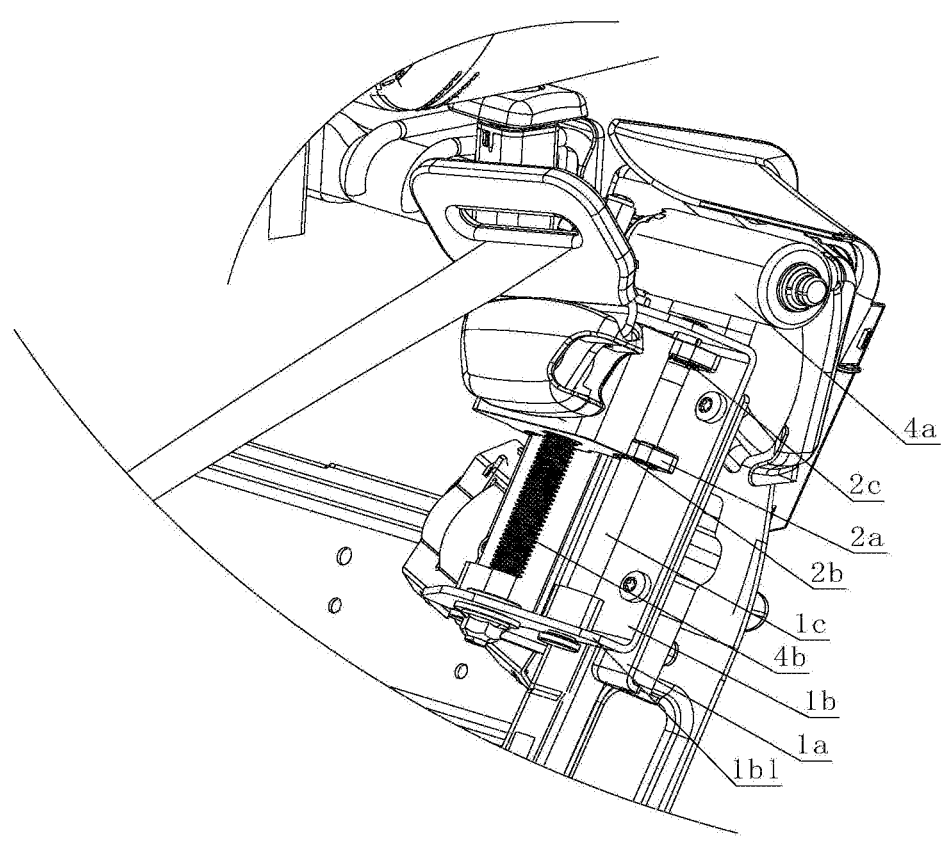
FIG. 2 is a partial 3D drawing of a height-adjustable safety belt guide outlet for a seat backrest.

Further in conjunction with FIG. 2, the base 1 is composed of a lower base 1a and an upper base 1b. In the present embodiment, the lower base 1a is fixedly mounted at a shoulder position of the backrest A. The upper base 1b is fixedly mounted above the lower base 1a by means of a screw. An upper end and a lower end of the upper base 1b have a support plate 1b1 that is outwardly bent over. The upper base 1b is a U-shaped structure. Two guide rods 1c are fixedly mounted between the two support plates 1b1. An upper end and a lower end of the sliding component 2 have a downwardly extending assembly plate 2a. A lower end of the assembly plate 2a has a sliding hole 2b. A bushing 2c is fitted in the sliding hole 2b. The sliding component 2 is slidably fitted over the guide rod 1c by means of the bushing 2c. With such a design, the sliding component 2 can be firmly fitted over the guide rod 1c, and the bushing 2c is used to make sliding smoother.

Furthermore, the driving assembly 4 comprises an electric motor 4a and a lead screw 4b that is in motive power connection with an output shaft of the electric motor 4a. In the present embodiment, the electric motor 4a is a reduction motor, and the electric motor 4a is fixedly mounted to an outer side of the support plate 1b1 of the upper end of the upper base 1b. An upper end and a lower end of the lead screw 4b is rotatably supported between the two support plates 1b1. An upper end of the lead screw 4b is in motive power connection with the output shaft of the electric motor 4a. The sliding component 2 is mounted to the lead screw 4b in a threaded manner. With such a design, the operation of the electric motor 4a drives rotation of the lead screw 4b, and, since the lead screw 4b is in threaded connection with the sliding component 2, and the sliding component 2 is also fitted on the guide rod 1c, the rotation of the lead screw 4b drives vertical motion of the sliding component 2, so as to achieve height adjustability of the safety belt guide outlet.

Figure 3:
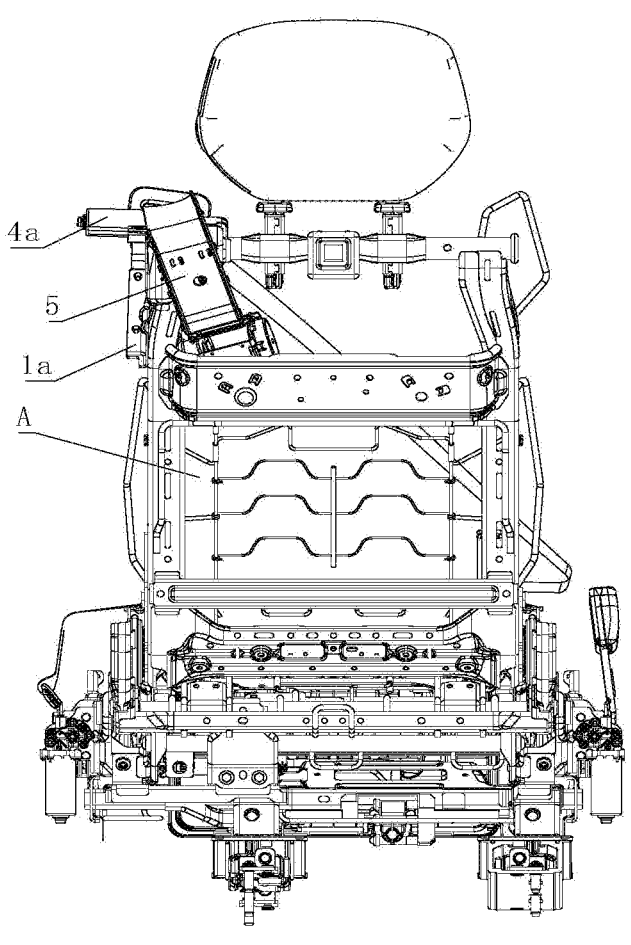
FIG. 3 shows an assembly drawing (rear view) of an automobile seat and a height-adjustable safety belt guide outlet for a seat backrest.

As shown in FIG. 3, the height-adjustable safety belt guide outlet further comprises a safety belt retractor 5 that is mounted to a shoulder rear side of the backrest A. A lower end of the safety belt retractor 5 is fixedly mounted on a framework of the backrest A by means of a screw. A safety belt passing out from the safety belt retractor 5 is slidably fitted to the safety belt guide component 3. With such a design, the safety belt and the seat are integrated together, such that contact between the safety belt and the occupant is closer fitting, effectively avoiding a problem of a restraining effect of the safety belt on the occupant reducing when the seat adjustment angle increases.

Figure 4:
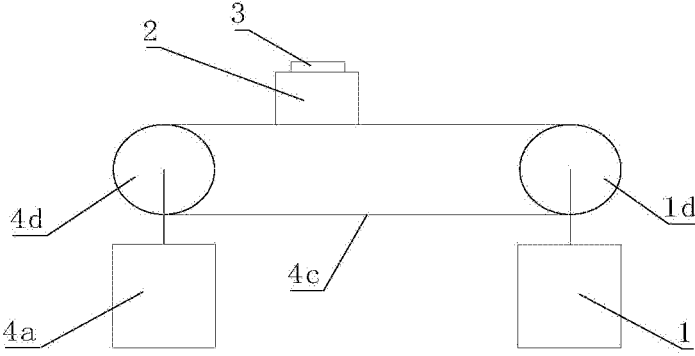
FIG. 4 shows an operating principle diagram of a driving assembly 4.

As shown in FIG. 4, in addition to the lead screw electric motor driving means above, the driving assembly 4 may also be composed of an electric motor 4a and a synchronous belt 4c. A synchronous wheel 4d is fitted over an output end of the electric motor 4a. A directional wheel 1d is fixedly mounted on the base 1. The synchronous belt 4c is fitted over the synchronous wheel 4d and the directional wheel 1d. The sliding component 2 is fixedly mounted to one side of the synchronous belt. With such a design, the operation of the electric motor 4a drives the synchronous belt 4c to rotate, and the rotation of the synchronous belt 4c drives vertical motion of the sliding component 2, so as to achieve height adjustment of the safety belt guide outlet.

Finally, it must be explained that the above merely describes preferred embodiments. A person skilled in the art, having been enlightened by the foregoing, may make various similar representations without going against the purpose of the disclosure and the claims, all such changes falling within the scope of protection of the present application.

What is claimed is:

1. A height-adjustable safety belt guide outlet for a seat backrest, wherein the height-adjustable safety belt guide outlet comprises:
    a backrest;
    a base, which is fixedly mounted at a shoulder position of the backrest;
    a sliding component, the sliding component being fitted on the base so as to be able to slide vertically in a height direction of the backrest;
    a safety belt guide component, which is fixedly mounted on the sliding component;
    and a driving assembly, which is fitted between the base and the sliding component, and used for driving the sliding component to slide vertically.

2. The height-adjustable safety belt guide outlet for a seat backrest as claimed in claim 1, wherein: the base comprises a lower base and an upper base that is fixedly mounted on the lower base by means of a screw, the lower base being fixedly fitted at the shoulder position of the backrest.

3. The height-adjustable safety belt guide outlet for a seat backrest as claimed in claim 2, wherein: an upper end and a lower end of the upper base are provided with an upwardly bent support plate, two guide rods being fixedly mounted between two groups of said support plates, an upper end and a lower end of the sliding component being provided with a downwardly extending assembly plate, and a sliding hole that slidably fits over the guide rod being provided on the assembly plate.

4. The height-adjustable safety belt guide outlet for a seat backrest as claimed in claim 3, wherein: the driving assembly comprises an electric motor and a lead screw that is in motive power connection with an output shaft of the electric motor, the electric motor being fixedly fitted on an outer side of one of the support plates, and two ends of the lead screw being rotatably supported on two said support plates.

5. The height-adjustable safety belt guide outlet for a seat backrest as claimed in claim 4, wherein: the electric motor is a reduction motor, and an upper end of the lead screw is in motive power connection with an output end of the electric motor.

6. The height-adjustable safety belt guide outlet for a seat backrest as claimed in claim 1, wherein: the height-adjustable safety belt guide outlet further comprises a safety belt retractor that is mounted on a shoulder rear side of the backrest.

7. The height-adjustable safety belt guide outlet for a seat backrest as claimed in claim 3, wherein: a bushing is fitted in the sliding hole.

8. The height-adjustable safety belt guide outlet for a seat backrest as claimed in claim 3, wherein: the sliding component is a linear sliding block.

9. The height-adjustable safety belt guide outlet for a seat backrest as claimed in claim 1, wherein: the driving assembly comprises an electric motor and a synchronous belt, a synchronous wheel being fitted over an output end of the electric motor, a directional wheel being provided on the base, the synchronous belt being fitted over the synchronous wheel and the directional wheel, and the sliding component being fixedly mounted to one side of the synchronous belt.

\* \* \* \* \*